(12) United States Patent
Nakagawa

(10) Patent No.: US 7,460,280 B2
(45) Date of Patent: Dec. 2, 2008

(54) IMAGE-READING APPARATUS FOR READING AN IMAGE ON A DOCUMENT BY CONTROLLING AN INDEX PERIOD AND A LINE-THINNING RATE BASED ON A MAGNIFICATION FACTOR

(75) Inventor: Jun Nakagawa, Tokyo (JP)

(73) Assignee: Konica Corporation, Tokyo (JP)

( * ) Notice: Subject to any disclaimer, the term of this patent is extended or adjusted under 35 U.S.C. 154(b) by 1038 days.

(21) Appl. No.: 10/334,216

(22) Filed: Dec. 30, 2002

(65) Prior Publication Data
US 2003/0133171 A1 Jul. 17, 2003

(30) Foreign Application Priority Data
Jan. 15, 2002 (JP) ............... 2002-006114

(51) Int. Cl.
*H04N 1/04* (2006.01)
(52) U.S. Cl. ............... 358/486; 358/474; 358/443; 358/445; 358/451; 382/298; 382/299; 382/258
(58) Field of Classification Search ......... 358/486, 358/461, 1.1, 1.2, 1.5, 1.9, 3.24, 451, 497, 358/494, 474, 445, 443, 448, 496; 382/298, 382/299, 258, 312, 318, 319; 348/135; 324/121; 345/440.1
See application file for complete search history.

(56) References Cited
U.S. PATENT DOCUMENTS
4,924,307 A * 5/1990 Landowski et al. ......... 348/135

5,535,007 A * 7/1996 Kim ............... 358/296
6,104,841 A * 8/2000 Tojo et al. ............ 382/299

FOREIGN PATENT DOCUMENTS
| JP | 06-038028 | | 2/1994 |
| JP | 08-152678 | | 6/1996 |
| JP | 10-023224 | * | 1/1998 |
| JP | 10-224616 | A | 8/1998 |
| JP | 2000-332959 | | 11/2000 |

* cited by examiner

*Primary Examiner*—Cheukfan Lee
(74) *Attorney, Agent, or Firm*—Frishauf, Holtz, Goodman & Chick, P.C.

(57) ABSTRACT

An image-reading apparatus reads an image on a document by controlling a main-scanning operation in accordance with an index period, a sub-scanning operation in accordance with a line-thinning rate, and a reading velocity of reading the image in a sub-scanning direction in accordance with a magnification factor. The apparatus includes an inputting section to input the magnification factor, an index period changing section to control the index period, based on the magnification factor, and a line-thinning rate changing section to control the line-thinning rate, based on the magnification factor. The index period changing section may select one of a plurality of index periods, including at least normal and long index periods, to control the index period. The thinning-rate changing section may select one of a plurality of line-thinning rates, including line-thinning rates indicating activation and deactivation of a line-thinning operation, to control the line-thinning rate.

7 Claims, 2 Drawing Sheets

IMAGE-READING APPARATUS FOR READING AN IMAGE ON A DOCUMENT BY CONTROLLING AN INDEX PERIOD AND A LINE-THINNING RATE BASED ON A MAGNIFICATION FACTOR

BACKGROUND OF THE INVENTION

The present invention relates to an image-reading apparatus, which read an image residing on a document by means of a photoelectronic converting element.

The image-reading apparatus has been employed as an image-inputting device for such an apparatus of an image scanner, a digital copier, a facsimile, etc. In order to achieve the image-reading operation, such the image-reading apparatus employs the photoelectronic converting element, such as the CCD (Charge Coupled Device), etc., for converting the image residing on the document to the electronic signals.

In the image-reading apparatus, which employs a one-dimensional image sensor, such as a one-dimensional CCD, etc., the image-reading operation in a main-scanning direction is performed by the electronic scanning action of the one dimensional image sensor, while the image-reading operation in a sub-scanning direction is performed by the mechanical scanning action for moving the one dimensional image sensor or the document in the sub-scanning direction. In such the configuration, by changing the sub-scanning velocity, it is possible to change the magnification factor in the sub-scanning direction. For instance, the reduction of the image size in the sub-scanning direction can be achieved by reading the original image with an increased sub-scanning velocity.

To increase the scanning velocity in the sub-scanning direction, however, the driving motor, having a capability of moving the document or the one-dimensional image sensor at a sufficiently high velocity, should be employed. Accordingly, it has been a problem that such the high-performance driving motor has been very expensive, resulting in an increase of the manufacturing cost of the image-reading apparatus. In addition, it has been also a problem that the high-speed operation of the driving motor causes the raise of malfunction rate and the generation of the motor noise.

To overcome the abovementioned problems, there has been well known, for instance, a method of making the sub-scanning velocity constant irrespective of the magnification factor for reading the original image by increasing the index period, as set forth in Tokkai 2000-332959. Incidentally, the term of the "index period" means a time interval required for reading one line of the document in the main-scanning direction. Further, as set forth in Tokkaihei 6-38028, Tokkaihei 8-152678 and Tokkaihei 10-23224, there has been well known a method of reducing the image size of the document in the sub-scanning direction by changing the line-thinning rate in accordance with the reading magnification factor for the document, without employing the driving motor having a high-speed rotating capability. Incidentally, the term of the "line-thinning" is to thin out a number of lines to be read in the sub-scanning direction so as to reduce the image size of the document. Further, hereinafter, an operation for thinning out one line from every "n" lines ("n" is a positive integer being equal to or larger than 2) is defined as a "1/n line-thinning operation".

When the index period is set at a longer time, however, it has bee necessary to increase the storing capacity of the storage in which the image-signals concerned are stored. Further, since the time necessary for accumulating the image-signal charges in the CCD becomes large, it has been necessary to take such a countermeasure of considerably lowering the gain of the pre-amplifier, or reducing the brightness of the illumination lamp for irradiating the document. On the other hand, it has been another problem that the image quality is considerably deteriorated, when the line-thinning operation is conducted in accordance with the reading magnification factor for the document.

SUMMARY OF THE INVENTION

To overcome the abovementioned drawbacks in conventional image-reading apparatus, it is an object of the present invention to provide an image-reading apparatus, in which the scanning velocity in the sub-scanning direction is suppressed at a level being lower than a predetermined velocity when reading the image on the document in the image-size reduction mode, and which makes it possible to suppress the deterioration of the image quality of the read image to a minimum level.

Accordingly, to overcome the cited shortcomings, the abovementioned object of the present invention can be attained by image-reading apparatus described as follow.

(1) An apparatus for reading an image residing on a document by controlling a main-scanning operation in response to an index period, a sub-scanning operation in response to a line-thinning rate and a reading velocity in a sub-scanning direction in response to a magnification factor for reading the image, the apparatus comprising: an inputting section to input the magnification factor; an index period changing section to change the index period, based on the magnification factor inputted by the inputting section; and a line-thinning rate changing section to change the line-thinning rate, based on the magnification factor inputted by the inputting section.

(2) The apparatus of item 1, wherein the index period changing section selects a certain index period out of a plurality of various index periods, including at least a normal index period and a long index period, to change the index period.

(3) The apparatus of item 2, wherein the line-thinning rate changing section selects a certain line-thinning rate out of a plurality of various line-thinning rates, including at least two line-thinning rates, which indicate activation and deactivation of a line-thinning operation, to change the line-thinning rate.

(4) The apparatus of item 1, wherein the line-thinning rate changing section selects a certain line-thinning rate out of a plurality of various line-thinning rates, including at least two line-thinning rates, which indicate activation and deactivation of a line-thinning operation, to change the line-thinning rate.

(5) The apparatus of item 1, wherein, when the magnification factor inputted by the inputting section is substantially in a range of 66%-100%, the line-thinning rate, changed by the line-thinning rate changing section, indicates deactivation of a line-thinning operation.

(6) The apparatus of item 2, wherein, when the magnification factor inputted by the inputting section is substantially in a range of 66%-100%, the line-thinning rate, changed by the line-thinning rate changing section, indicates deactivation of a line-thinning operation.

(7) The apparatus of item 3, wherein, when the magnification factor inputted by the inputting section is substantially in a range of 66%-100%, the line-thinning rate, changed by the line-thinning rate changing section, indicates deactivation of the line-thinning operation.

(8) The apparatus of item 4, wherein, when the magnification factor inputted by the inputting section is substantially in a range of 66%-100%, the line-thinning rate, changed by the line-thinning rate changing section, indicates deactivation of the line-thinning operation.

Further, to overcome the abovementioned problems, other image-reading apparatus, embodied in the present invention, will be described as follow:

(9) An image-reading apparatus, characterized in that, in the image-reading apparatus, which reads a document image by conducting a reading control in a main-scanning direction corresponding to an index period, a reading control in a sub-scanning direction corresponding to a line-thinning rate and a reading velocity control in a sub-scanning direction corresponding to a reading magnification factor, an inputting means for inputting the reading magnification factor, a period variable means for varying the index period, based on the reading magnification factor inputted by the inputting means, a thinning rate variable means for varying the line-thinning rate, based on the reading magnification factor inputted by the inputting means are provided.

According to the image-reading apparatus mentioned in the above, by changing the index period and the line-thinning rate on the basis of the magnification factor for reading the image on the document, it becomes possible to suppress the scanning velocity in the sub-scanning direction when reading the image on the document in the reduction mode. Accordingly, it becomes possible to employ an inexpensive motor for moving the one-dimensional image sensor or the document, resulting in a cost-reduction of the whole system of the image-reading apparatus.

Further, by changing the combination of the index period and the line-thinning rate on the basis of the magnification factor for reading the image on the document, it becomes possible to prevent the storage for storing the digital image data from considerably increasing its storage capacity due to the setting of the long index period. In addition, it also becomes possible to prevent the deterioration of the image quality caused by increasing line-thinning rate.

(10) The image-reading apparatus described in item 9, characterized in that, by selecting one out of plural periods, including at least a normal index period and a long index period, the period variable means varies the index period.

According to the image-reading apparatus mentioned in the above, by setting a plurality of index periods in advance and selecting one of the plurality of index periods corresponding to the magnification factor for reading the image on the document, a suitable index period can be easily selected or changed, in comparison with the method in which the image reduction is achieved by continuously changing the index period. In addition, by avoiding a long index period when setting the plurality of index periods in advance, it becomes possible to prevent the storage for storing the digital image data from considerably increasing its storage capacity.

Further, by setting a plurality of index periods in advance, it becomes possible to collect the setting data necessary for the image-reading processing at every index period when the power of the image-reading apparatus is turned ON, as set forth in Tokkai 2001-157001. Accordingly, since it is unnecessary to collect the setting data at every time when the index period is changed, it becomes possible to expedite the image-reading processing.

(11) The image-reading apparatus described in item 9 or 10, characterized in that, by selecting one out of plural thinning rates, including at least two thinning rates, which indicates whether or not a thinning operation is performed, the thinning rate variable means varies the line-thinning rate.

According to the image-reading apparatus mentioned in the above, by setting a plurality of line-thinning rates in advance and selecting one of the plurality of line-thinning rates corresponding to the magnification factor for reading the image on the document, a suitable line-thinning rate can be easily selected or changed, in comparison with the method in which the image reduction is achieved by continuously changing the line-thinning rate. In addition, by avoiding a large line-thinning rate when setting the plurality of line-thinning rates in advance, it becomes possible to prevent the deterioration of the image quality.

(12) The image-reading apparatus described in anyone of items 9-11, characterized in that, when the reading magnification factor inputted by the inputting means is substantially in a range of 66%-100%, the line-thinning rate, varied by the thinning rate variable means, is a thinning rate indicating non-execution of line-thinning operation.

According to the image-reading apparatus mentioned in the above, since the operating frequency at a magnification factor of around 70% is the highest, by deactivating the line-thinning operation in the range of 66%-100%, it becomes possible to prevent the deterioration of the image quality in a range of the magnification factor in which the operating frequency is high.

Incidentally, as is clear in the above, the present invention only relates to the size-reduction processing of the image in the sub-scanning direction. The size-reduction processing of the image in the main-scanning direction will be performed in the image-processing circuit (not shown in the drawings) provided in the later stage after the size-reduction processing of the image in the sub-scanning direction is completed.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

FIRST EMBODIMENT

Figure 1:
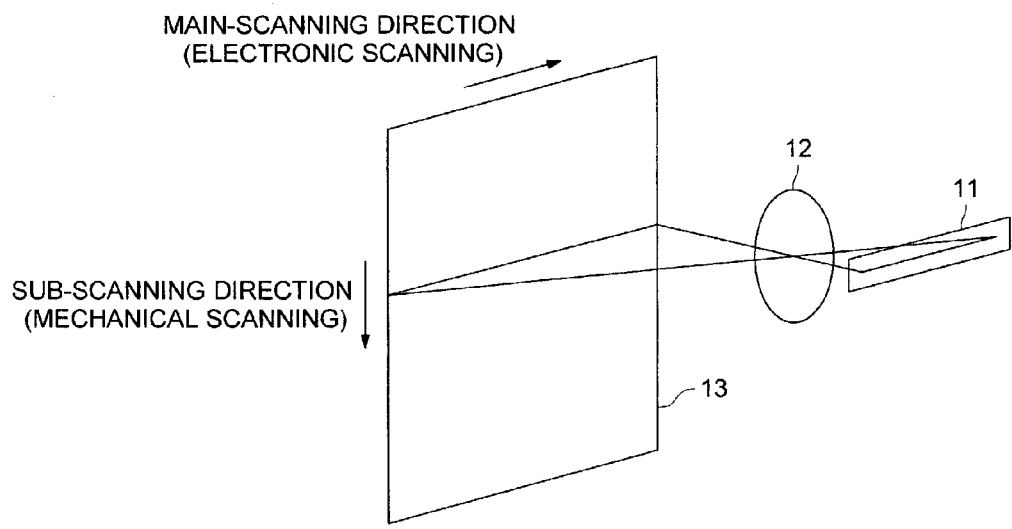
FIG. 1 shows a rough schematic diagram of the image-reading apparatus embodied in the present invention.

Referring to the drawings, the first embodiment of the present invention will be detailed in the following. Initially, the configuration of the image-reading apparatus, embodied in the present invention, will be detailed in the following. FIG. 1 shows a rough schematic diagram of the image-reading apparatus employing one-dimensional image sensor 11. In the image-reading apparatus, the image residing on document 13, serving as an object of the image-reading operation, is converted to electronic signals by using one-dimensional image sensor 11 and lens 12.

One-dimensional image sensor 11 comprises CCD serving as a photoelectric converting element for converting light to the electronic signals, etc. The CCD includes a plurality of photodiodes, each of which stores an electronic charge generated in response to the received light intensity in it, in order to convert the image to the electronic signals.

Lens 12 focuses the light reflected from document 13 irradiated by the illumination lamp, etc. (not shown in the drawings), onto one-dimensional image sensor 11.

In the image-reading apparatus, to read the whole image on document 13, the image-reading operation in a main-scanning direction is performed by the electronic scanning action of one-dimensional image sensor 11, while the image-reading operation in a sub-scanning direction is performed by the mechanical scanning action for moving one-dimensional image sensor 11 and lens 12.

Figure 2:
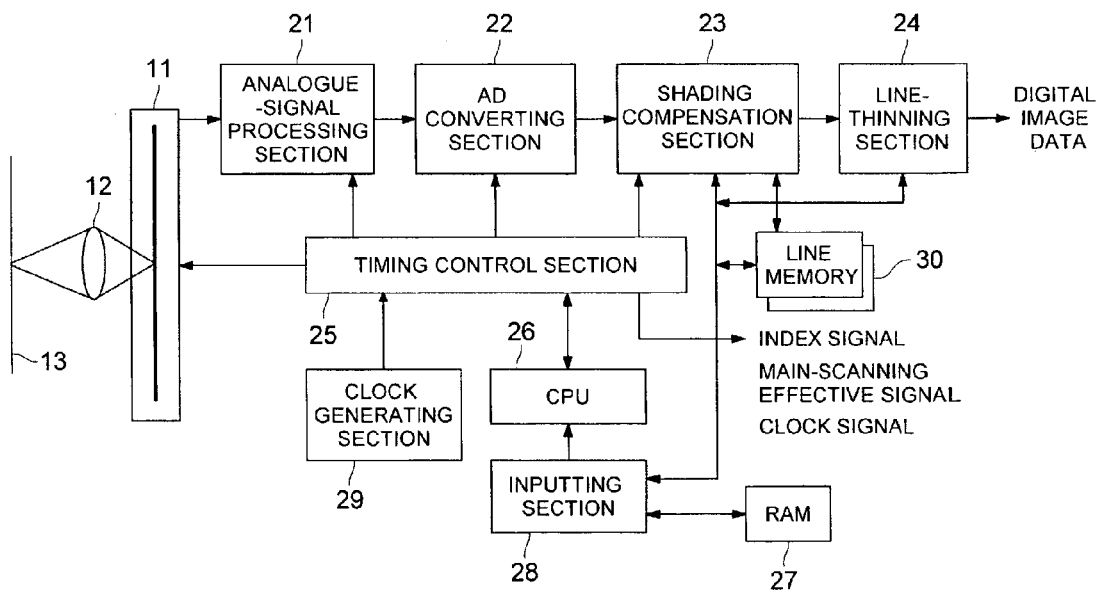
FIG. 2 shows a block diagram of the electric-wise configuration of the image-reading apparatus embodied in the present invention.

FIG. 2 shows a block diagram of the electric-wise configuration of the image-reading apparatus. As shown in FIG. 2, the image-reading apparatus comprises one-dimensional image sensor 11, lens 12, analogue-signal processing section 21, AD (Analogue to Digital) converting section 22, shading compensation section 23, line-thinning section 24, timing control section 25, CPU (Central Processing Unit) 26, RAM (Random Access Memory) 27, inputting section 28, clock generating section 29 and line memory 30.

Analogue-signal processing section 21 inputs a one-line signal of document 13 from one-dimensional image sensor 11 to perform an offset voltage adjusting operation, a gain adjusting operation, a noise suppressing operation, a signal amplifying operation, etc., and then, outputs the one-line signal to AD converting section 22.

Further, to perform the offset voltage adjusting operation and the gain adjusting operation, analogue-signal processing section 21 inputs an offset voltage adjusting value and a gain adjusting value from CPU 26. The offset voltage adjusting operation is to compensate for the offset voltage caused by a dark current generated in one-dimensional image sensor 11 when the whole area of document 13 is black, and is performed on the basis of the offset voltage adjusting value stored in RAM 27. The gain adjusting operation is to adjust the quality of the image read by one-dimensional image sensor 11, and is performed on the basis of the gain adjusting value stored in RAM 27.

AD converting section 22 inputs analogue signals from analogue-signal processing section 21 to covert the inputted analogue signals to digital image data, and then, outputs the digital image data to shading compensation section 23.

Shading compensation section 23 applies a shading compensation processing to the digital image data inputted from AD converting section 22. The shading compensation processing is to compensate for distortions in the digital image data, caused by the sensitivity variation of the photodiodes included in the CCD, constituting one-dimensional image sensor 11, and/or caused by the reduced light intensity at a peripheral area of the optical system, on the basis of a black level reference data and a white level reference data. The black level reference data is defined as image data obtained in case that one-dimensional image sensor 11 reads the all black image, while the white level reference data is defined as image data obtained in case that one-dimensional image sensor 11 reads the all white image. When the shading compensation processing is completed, shading compensation section 23 output the compensated image data to line-thinning section 24.

In line-thinning section 24, the line-thinning operation is performed at a predetermined thinning rate with respect to the compensated image data inputted from shading compensation section 23. Concretely speaking, when reading the image on document 13 at a reduced image size, the reduction of the image size is achieved by thinning out one line from every group of "n" lines ("n" is a positive integer being equal to or larger than 2) in the sub-scanning direction of document 13. CPU 26 determines the line-thinning rate corresponding to the magnification factor for reading document 13, and outputs the determined line-thinning rate to line-thinning section 24. In the image-reading apparatus serving as the first embodiment, either a command signal indicating deactivation of the line-thinning operation or another command signal indicating activation of the line-thinning operation with a line-thinning rate of ½ is stored in the register of CPU 26 in advance. The image data processed in line-thinning section 24 are outputted to an external electronic circuit (not shown in the drawings) having a storage section and equipped outside the image-reading apparatus. Incidentally, it is also applicable that the storage section is provided in the image-reading apparatus.

Timing control section 25 outputs command signals for commanding the operating timings of one-dimensional image sensor 11, analogue-signal processing section 21, AD converting section 22 and shading compensation section 23. Further, timing control section 25 also outputs an index signal, a main-scanning effective signal and clock signals, serving as controlling signals for each of other circuits (not shown in the drawings) included in the image-reading apparatus.

CPU 26 outputs various kinds of signals or data for controlling circuit operations to analogue-signal processing section 21, shading compensation section 23, line-thinning section 24, timing control section 25, RAM 27 and line memory 30.

Concretely speaking, CPU 26 outputs the offset voltage adjusting value and the gain adjusting value to analogue-signal processing section 21, after retrieving them from RAM 27. Further, CPU 26 outputs the white level reference data and the black level reference data, which are necessary for the shading compensation processing, to shading compensation section 23, after retrieving them from RAM 27. Still further, CPU 26 outputs the command signal, for commanding the line-thinning rate corresponding to the reading magnification factor inputted through inputting section 28, to line-thinning section 24. Still further, CPU 26 outputs the command signal, for commanding the operating timing in response to the index period, to timing control section 25. Still further, CPU 26 retrieves the white level reference data set and the black level reference data set, which corresponds to the index period, from a plurality of white and black level reference data sets stored in RAM 27, and stores the white level reference data set and the black level reference data set in line memory 30.

CPU 26 stores the data, necessary for setting operations in each of the circuits included in the image-reading apparatus, in RAM 27, and then, CPU 26 retrieves the data from RAM 27 as needed. For instance, the data, such as the offset voltage adjusting value, the gain adjusting value, the white level reference data, the black level reference data, etc., which are collected when the power of the image-reading apparatus is turned ON, are stored in RAM 27.

The setting values necessary for reading the image, such as the reading magnification factor of document 13, are inputted through inputting section 28 by the user or from the external apparatus, and the inputted data are transmitted to CPU 26.

Clock generating section 29 outputs pulse signals having a constant frequency to timing control section 25.

CPU 26 stores the white level reference data and the black level reference data, corresponding to the index period, in line memory 30.

Figure 3:
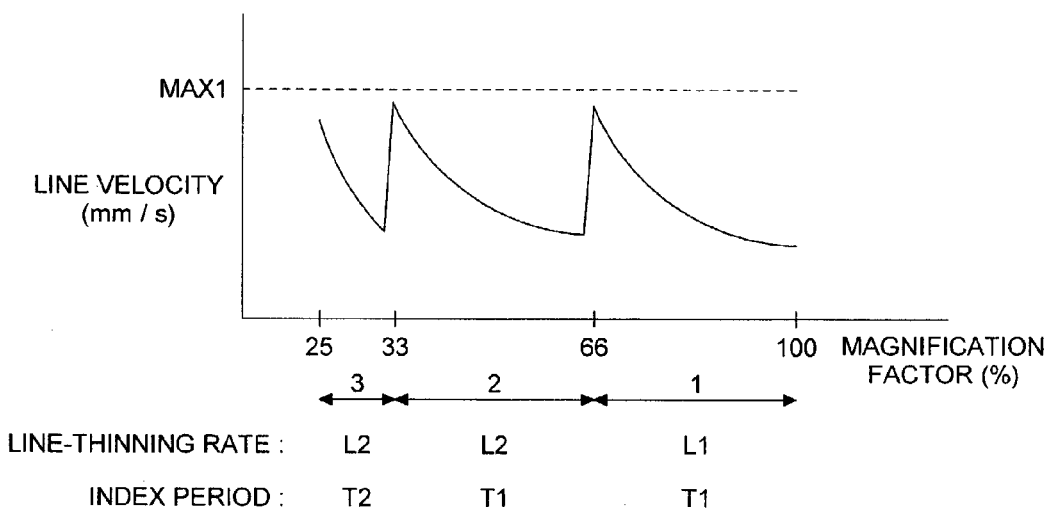
FIG. 3 shows a graph of relationship between combinations of the index periods and the line-thinning rates and line velocities within a range of the magnification factor for reading the image in the first embodiment.

FIG. 3 shows a graph of relationship between combinations of the index periods and the line-thinning rates and line velocities within a range of the magnification factor for reading the image. The line velocity is defined as a moving velocity of one-dimensional image sensor 11 when reading the image on document 13 in the sub-scanning direction. In FIG. 3, the line velocity value of MAX1 on the vertical axis is the maximum moving velocity of one-dimensional image sensor 11 in the sub-scanning. When the line velocity reaches to the maximum moving velocity of MAX1, the driving motor for driving one-dimensional image sensor 11 also rotates at its maximum rotating velocity. Therefore, the line velocity should be always less than the maximum moving velocity of MAX1.

In the register provided in CPU 26, normal index period T1 and long index period T2, being longer than T1, are set in advance as index period data, and first line-thinning rate L1 and second line-thinning rate L2 are also set in advance as line-thinning data. First line-thinning rate L1 is set at L1=0, indicating deactivation of the line-thinning operation, while second line-thinning rate L2 is set at L2=½, indicating activation of the line-thinning operation for thinning out one line from every pair of two lines.

At first, when the magnification factor is in a range of 66%-100%, CPU 26 determines the execution of the image-reading operation employing normal index period T1 and first line-thinning rate L1. Then, since the line velocity approaches the maximum moving velocity of MAX1 according as the magnification factor decreases to 66%, CPU 26 determines the execution of the image-reading operation employing normal index period T1 and second line-thinning rate L2, when the magnification factor enters in a range of 33%-66%. Accordingly, since the line-thinning rate is set at ½, it becomes possible to decrease the line velocity.

Further, since the line velocity again approaches the maximum moving velocity of MAX1 according as the magnification factor decreases to 33%, CPU 26 determines the execution of the image-reading operation employing longer index period T2 and second line-thinning rate L2, when the magnification factor enters in a range of 25%-33%. Accordingly, since the index period is getting longer and the line-thinning rate is set at ½, it becomes possible to decrease the line velocity.

Next, operations of the image-reading apparatus, embodied in the present invention, will be detailed in the following. Initially, during the idling state of the image-reading apparatus concerned after its power is turned ON, the offset voltage adjusting value, the gain adjusting value, the black level reference data and the white level reference data are collected. Although the abovementioned data would vary with every index period, since only two kinds of index periods are employed in the first embodiment of the present invention, it is sufficient to collect only two kinds of data sets, each of which corresponds to data set when employing normal index period T1 and another data set when employing long index period T2, respectively. CPU 26 stores the collected data in RAM 27.

Successively, CPU 26 inputs the image-reading magnification factor established in inputting section 28, in order to determine the index period and line-thinning rate, based on the magnification factor shown in FIG. 3. Then, CPU 26 outputs the data of the index period to timing control section 25 and outputs the data of the line-thinning rate to line-thinning section 24. Further, CPU 26 retrieves the black level reference data and the white level reference data, both corresponding to the index period concerned, from the data stored in RAM 27, and stores them in line memory 30.

Successively, under the control signals outputted from timing control section 25, one-dimensional image sensor 11 reads one-line of the image on document 13 and converts it to the electronic signals. The converted electronic signals are inputted into analogue-signal processing section 21, in which signal processing operations, such as the offset voltage adjusting operation, the gain adjusting operation, noise reduction operation, the signal amplifying operation, etc., are performed with respect to the inputted electronic signals. CPU 26 retrieves the offset voltage adjusting value and the gain adjusting value from RAM 27 so as to output them to analogue-signal processing section 21.

The electronic signals processed in analogue-signal processing section 21 are converted into digital image data in AD converting section 22, which outputs the digital image data to shading compensation section 23. CPU 26 retrieves the black level reference data and the white level reference data from line memory 30 and outputs them to shading compensation section 23 in which the shading compensation processing is performed with respect to the inputted digital image data.

The digital image data processed by the shading compensation are outputted to line-thinning section 24. In line-thinning section 24, the line-thinning processing is performed with respect to the inputted digital image data, based on the line-thinning rate inputted from CPU 26. The digital image data processed by the line-thinning operation are outputted to another circuit (not shown in the drawings).

Next, one-dimensional image sensor 11 further moves in the sub-scanning direction, in order to convert next one-line of the image into the electronic signals. The successive operations are repetitions of the operations described in the foregoing.

As described in the above, by determining the index period and the line-thinning rate, corresponding to the range of the magnification factor for reading document 13, the moving velocity of one-dimensional image sensor 11 can be suppressed at a value lower than the maximum velocity. Accordingly, it becomes possible to employ an inexpensive motor for moving one-dimensional image sensor 11, resulting in a cost-reduction of the whole system of the image-reading apparatus.

Further, by setting a plurality of index periods and a plurality of line-thinning rates in advance, a suitable combination of them can be easily selected or changed, in comparison with the method in which the image reduction is achieved by continuously changing the index period or the line-thinning rate.

Still further, by avoiding a long index period when setting an index period, it becomes possible to prevent the storage for storing the digital image data from considerably increasing its storage capacity.

Still further, by avoiding a large line-thinning rate when setting a line-thinning rate, it becomes possible to prevent the digital image data from deterioration of the image quality.

Still further, by collecting the offset voltage adjusting value, the gain adjusting value, the black level reference data and the white level reference data at every index period when the power of the image-reading apparatus is turned ON, it becomes unnecessary to collect them every time of changing the index period. Accordingly, it becomes possible to speedily perform the image-reading operation when the magnification factor for reading document 13 is changed.

Incidentally, in the first embodiment of the present invention, normal index period T1 and second line-thinning rate L2 are employed for the image-reading operation when the magnification factor for reading document 13 is in the range of 33%-66%. This is because, by setting the line-thinning rate at ½, an amount of digital image data can be reduced to a half-amount, and the image-reading operation can be getting faster. The scope of the present invention, however, is not limited to the above. It is also applicable that long index period T2 and first line-thinning rate L1 are employed for the image-reading operation.

Second Embodiment

In the second embodiment of the present invention, an image-reading apparatus equipped with a motor, having a maximum velocity (MAX2) lower than the maximum velocity (MAX1) of the motor for moving one-dimensional image sensor 11 in the image-reading apparatus serving as the first embodiment of the present invention, will be detailed in the following.

In the second embodiment of the present invention, since the principle of the image-forming apparatus, the configuration of the circuit block diagram and the operations of them are the same as those of the first embodiment, only the points different from the first embodiment will be intensively detailed in the following, using the same reference numbers in regard to the same sections.

Figure 4:
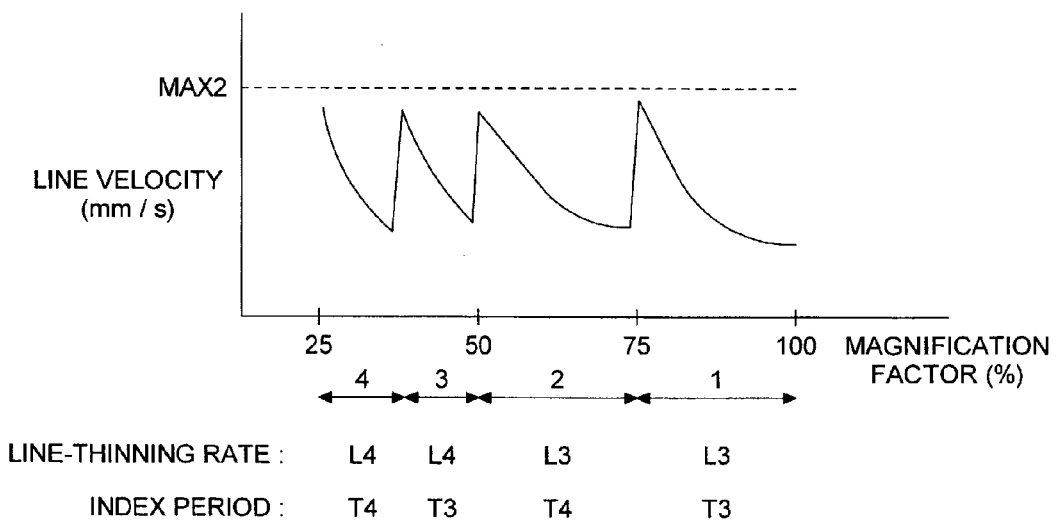
FIG. 4 shows a graph of relationship between combinations of the index periods and the line-thinning rates and line velocities within a range of the magnification factor for reading the image in the second embodiment.

FIG. 4 shows a graph of relationship between combinations of the index periods and the line-thinning rates and line velocities within a range of the magnification factor for reading the image. In FIG. 4, the line velocity value of MAX2 on the vertical axis is the maximum moving velocity of one-dimensional image sensor 11 in the sub-scanning, and is smaller than MAX1 (namely, MAX1>MAX2). When the line velocity reaches to the maximum moving velocity of MAX2, the driving motor for driving one-dimensional image sensor 11 also rotates at its maximum rotating velocity. Therefore, the line velocity should be always less than the maximum moving velocity of MAX2.

In the register provided in CPU 26, normal index period T3 and long index period T4, being longer than T3, are set in advance as index period data, and third line-thinning rate L3 and fourth line-thinning rate L4 are also set in advance as line-thinning data. Third line-thinning rate L3 is set at L3=0, indicating deactivation of the line-thinning operation, while fourth line-thinning rate L4 is set at L4=½, indicating activation of the line-thinning operation for thinning out one line from every pair of two lines.

At first, when the magnification factor is in a range of 75%-100%, CPU 26 determines the execution of the image-reading operation employing normal index period T3 and third line-thinning rate L3. Then, since the line velocity approaches the maximum moving velocity of MAX2 according as the magnification factor decreases to 75%, CPU 26 determines the execution of the image-reading operation employing normal index period T4 and third line-thinning rate L3, when the magnification factor enters in a range of 50%-75%. Accordingly, since the index period is getting longer, it becomes possible to decrease the line velocity.

Further, since the line velocity again approaches the maximum moving velocity of MAX2 according as the magnification factor decreases to 50%, CPU 26 determines the execution of the image-reading operation employing normal index period T3 and fourth line-thinning rate L4, when the magnification factor enters in a range of 37%-50%. Accordingly, since the line-thinning rate is set at ½, it becomes possible to decrease the line velocity.

Further, since the line velocity again approaches the maximum moving velocity of MAX2 according as the magnification factor decreases to 37%, CPU 26 determines the execution of the image-reading operation employing longer index period T4 and fourth line-thinning rate L4, when the magnification factor enters in a range of 25%-37%. Accordingly, since the index period is getting longer and the line-thinning rate is set at ½, it becomes possible to decrease the line velocity.

As described in the above, when the maximum rotating velocity of the motor, for moving one-dimensional image sensor 11 in the image-reading apparatus, is low, by increasing the divided regions of the magnification factor for reading the image and by suitably allotting each of plural combinations of the index periods and the line-thinning rates to every range of the magnification factor for reading the image, the moving velocity of one-dimensional image sensor 11 can be suppressed at a level lower than the maximum moving velocity. Accordingly, instead of employing an expensive motor having a capability of rotating at a high velocity, it becomes possible to employ an inexpensive motor for moving one-dimensional image sensor 11, resulting in a cost-reduction of the whole system of the image-reading apparatus.

Incidentally, in the second embodiment of the present invention, long index period T4 and third line-thinning rate L3 are employed for the image-reading operation when the magnification factor for reading document 13 is in the range of 50%-75%. This is because, since a value around 70% is frequently employed as the magnification factor for reading document 13, it is desirable that the line-thinning operation is not performed in the abovementioned range in order to prevent the deterioration of the image quality. The scope of the present invention, however, is not limited to the above combination. It is also applicable that normal index period T3 and fourth line-thinning rate L4 are employed for the image-reading operation in the range of 50%-75%. As well as the above, although normal index period T3 and fourth line-thinning rate L4 are employed for the image-reading operation in second embodiment when the magnification factor for reading document 13 is in the range of 37%-50%, the scope of the present invention, however, is not limited to this combination. It is also applicable that long index period T4 and third line-thinning rate L3 are employed for the image-reading operation in the range of 37%-50%.

As described in the foregoing, according to the present invention, the following effects can be attained.

(1) By changing the index period and the line-thinning rate on the basis of the magnification factor for reading the image on the document, it becomes possible to suppress the scanning velocity in the sub-scanning direction when reading the image on the document in the reduction mode. Accordingly, it becomes possible to employ an inexpensive motor for moving the one-dimensional image sensor or the document, resulting in a cost-reduction of the whole system of the image-reading apparatus.

(2) Further, by changing the combination of the index period and the line-thinning rate on the basis of the magnification factor for reading the image on the document, it becomes possible to prevent the storage for storing the digital image data from considerably increasing its storage capacity due to the setting of the long index period. In addition, it also becomes possible to prevent the deterioration of the image quality caused by increasing line-thinning rate.

(3) Still further, by setting a plurality of index periods in advance and selecting one of the plurality of index periods corresponding to the magnification factor for reading the image on the document, a suitable index period can be easily selected or changed, in comparison with the method in which the image reduction is achieved by continuously changing the index period. In addition, by avoiding a long index period when setting the plurality of index periods in advance, it becomes possible to prevent the storage for storing the digital image data from considerably increasing its storage capacity.

(4) Still further, by setting a plurality of index periods in advance, it becomes possible to collect the setting data necessary for the image-reading processing at every index period when the power of the image-reading apparatus is turned ON, as set forth in Tokkai 2001-157001. Accordingly, since it is unnecessary to collect the setting data at every time when the index period is changed, it becomes possible to expedite the image-reading processing.

(5) Still further, by setting a plurality of line-thinning rates in advance and selecting one of the plurality of line-thinning rates corresponding to the magnification factor for reading the image on the document, a suitable line-thinning rate can be easily selected or changed, in comparison with the method in which the image reduction is achieved by continuously changing the line-thinning rate. In addition, by avoiding a large line-thinning rate when setting the plurality of line-thinning rates in advance, it becomes possible to prevent the deterioration of the image quality.

(6) Still further, since the operating frequency at a magnification factor of around 70% is the highest, by deactivating the line-thinning operation in the range of 66%-100%, it becomes possible to prevent the deterioration of the image quality in a range of the magnification factor in which the operating frequency is high.

Disclosed embodiment can be varied by a skilled person without departing from the spirit and scope of the invention.

What is claimed is:

1. An apparatus for reading an image on a document by controlling: a main-scanning operation in accordance with an index period, which is defined as a time interval required for reading one line of the document in a main-scanning direction, a sub-scanning operation in accordance with a line-thinning rate, and a reading velocity of reading the image in a sub-scanning direction in accordance with a magnification factor, said apparatus comprising:
   an inputting section to control said magnification factor;
   an index period changing section to control said index period, based on said magnification factor; and
   a line-thinning rate changing section to control said line-thinning rate, based on said magnification factor;
   wherein said index period changing section controls the index period by selecting one index period out of a plurality of index periods, and
   wherein the plurality of index periods include a normal index period and a long index period.

2. The apparatus of claim 1,
   wherein said line-thinning rate changing section controls the line-thinning rate by selecting one line-thinning rate out of a plurality of line-thinning rates,
   wherein the plurality of line-thinning rates include line-thinning rates indicating activation and deactivation of a line-thinning operation.

3. The apparatus of claim 2,
   wherein, when said magnification factor is substantially in a range of 66%-100%, the line-thinning rate indicates deactivation of the line-thinning operation.

4. The apparatus of claim 1,
   wherein, when said magnification factor is substantially in a range of 66%-100%, the line-thinning rate indicates deactivation of a line-thinning operation.

5. An apparatus for reading an image on a document by controlling: a main-scanning operation in accordance with an index period, which is defined as a time interval required for reading one line of the document in a main-scanning direction, a sub-scanning operation in accordance with a line-thinning rate, and a reading velocity of reading the image in a sub-scanning direction in accordance with a magnification factor, said apparatus comprising:
   an inputting section to control said magnification factor;
   an index period changing section to control said index period, based on said magnification factor; and
   a line-thinning rate changing section to control said line-thinning rate, based on said magnification factor;
   wherein said line-thinning rate changing section controls the line-thinning rate by selecting one line-thinning rate out of a plurality of line-thinning rates, and
   wherein the plurality of line-thinning rates include line-thinning rates indicating activation and deactivation of a line-thinning operation.

6. The apparatus of claim 5,
   wherein, when said magnification factor is substantially in a range of 66%-100%, the line-thinning rate indicates deactivation of the line-thinning operation.

7. An apparatus for reading an image on a document by controlling: a main-scanning operation in accordance with an index period, which is defined as a time interval required for reading one line of the document in a main-scanning direction, a sub-scanning operation in accordance with a line-thinning rate, and a reading velocity of reading the image in a sub-scanning direction in accordance with a magnification factor, said apparatus comprising:
   an inputting section to control said magnification factor;
   an index period changing section to control said index period, based on said magnification factor; and
   a line-thinning rate changing section to control said line-thinning rate, based on said magnification factor;
   wherein, when said magnification factor is substantially in a range of 66%-100%, the line-thinning rate indicates deactivation of a line-thinning operation.

* * * * *